(12) United States Patent
Liu et al.

(10) Patent No.: US 11,585,698 B2
(45) Date of Patent: Feb. 21, 2023

(54) FIBER OPTIC TEMPERATURE PROBE

(71) Applicant: Photon Control Inc., Richmond (CA)

(72) Inventors: Yi Liu, Richmond (CA); Jose Jay Ruben Joven Apeles, Richmond (CA); Michael Feaver, Richmond (CA); Yoshua Ichihashi, Richmond (CA)

(73) Assignee: Photon Control Inc., Richmond, CA (US)

( * ) Notice: Subject to any disclaimer, the term of this patent is extended or adjusted under 35 U.S.C. 154(b) by 521 days.

(21) Appl. No.: 16/571,298

(22) Filed: Sep. 16, 2019

(65) Prior Publication Data

US 2021/0080328 A1    Mar. 18, 2021

(51) Int. Cl.
| | |
|---|---|
| *G01J 5/00* | (2022.01) |
| *G01J 5/0821* | (2022.01) |
| *G01K 11/32* | (2021.01) |
| *G01J 5/0806* | (2022.01) |

(52) U.S. Cl.
CPC .......... *G01J 5/0821* (2013.01); *G01J 5/0806* (2013.01); *G01K 11/32* (2013.01)

(58) Field of Classification Search
CPC ...... G01J 5/0821; G01J 5/0806; G01K 11/32; G02B 6/0005; G02B 6/04; G02B 6/4416; G02B 6/4475
USPC ....... 374/130, 131, 161, 208; 356/42, 43, 44
See application file for complete search history.

(56) References Cited

U.S. PATENT DOCUMENTS

| 4,652,143 A | 3/1987 | Wickersheim et al. |
| 5,277,496 A * | 1/1994 | Mayer .................. G01J 5/0821 374/208 |
| 6,225,453 B1 * | 5/2001 | Ueyama ................ C12Q 1/689 435/6.16 |
| 6,226,453 B1 * | 5/2001 | Yam ........................ G01J 5/046 219/390 |

(Continued)

FOREIGN PATENT DOCUMENTS

| CN | 11887837 A | * | 3/2020 |
| CN | 212645740 U | * | 3/2021 |

(Continued)

OTHER PUBLICATIONS

International Search Report issued in corresponding PCT Application No. PCT/CA2020/051214; search completed Oct. 5, 2020.

*Primary Examiner* — Gail Kaplan Verbitsky
(74) *Attorney, Agent, or Firm* — CPST Intellectual Property Inc.; Brett J. Slaney

(57) ABSTRACT

There is provided a fiber optic temperature probe having a base, a first tube connected to the base, a second tube provided coaxially within the first tube, a probe tip extending through an opening in a distal end of the first tube; and an optical fiber extending from within the base through an opening in the proximal end of the first tube and being substantially coaxial with respect to the first tube. There is also provided a fiber optic temperature probe having a base, a first tube connected to the base, a probe tip extending through an opening in a distal end of the first tube, an optical fiber extending from within the base through an opening in the proximal end of the first tube and being substantially coaxial with respect to the first tube, and a first lens positioned between the probe tip and the optical fiber.

25 Claims, 13 Drawing Sheets

(56) References Cited

U.S. PATENT DOCUMENTS

| | | | |
|---|---|---|---|
| 7,080,940 B2 | 7/2006 | Gotthold et al. | |
| 7,286,237 B2 * | 10/2007 | Grossman | G01K 11/3206 374/E11.016 |
| 8,308,357 B2 * | 11/2012 | Kinugasa | G01K 11/3213 374/161 |
| 8,740,454 B2 * | 6/2014 | Takei | G01K 11/32 374/161 |
| 9,243,958 B2 * | 1/2016 | Goda | G01J 5/004 |
| 9,863,769 B2 * | 1/2018 | Anae | G01C 19/5712 |
| 2006/0140248 A1 * | 6/2006 | Gotthold | G01K 11/20 374/161 |
| 2012/0039357 A1 | 2/2012 | Levesque et al. | |
| 2013/0206760 A1 * | 8/2013 | Susko | G01K 13/00 137/5 |
| 2015/0185093 A1 | 7/2015 | Kitzman et al. | |
| 2018/0274987 A1 | 9/2018 | Stapleton | |
| 2022/0128417 A1 * | 4/2022 | Stapleton | G01K 11/3213 |

FOREIGN PATENT DOCUMENTS

| | | | | |
|---|---|---|---|---|
| CN | 212747694 U | * | 3/2021 | |
| EP | 3910303 A1 | * | 11/2021 | ............ G01K 11/12 |
| JP | S61125723 U | * | 8/1986 | |
| JP | 2753578 B2 | * | 5/1998 | |
| JP | 2001141955 A | * | 5/2001 | |
| WO | 2005108941 A2 | | 11/2005 | |
| WO | WO-2021051204 A1 | * | 3/2021 | ............ G01K 11/32 |

\* cited by examiner

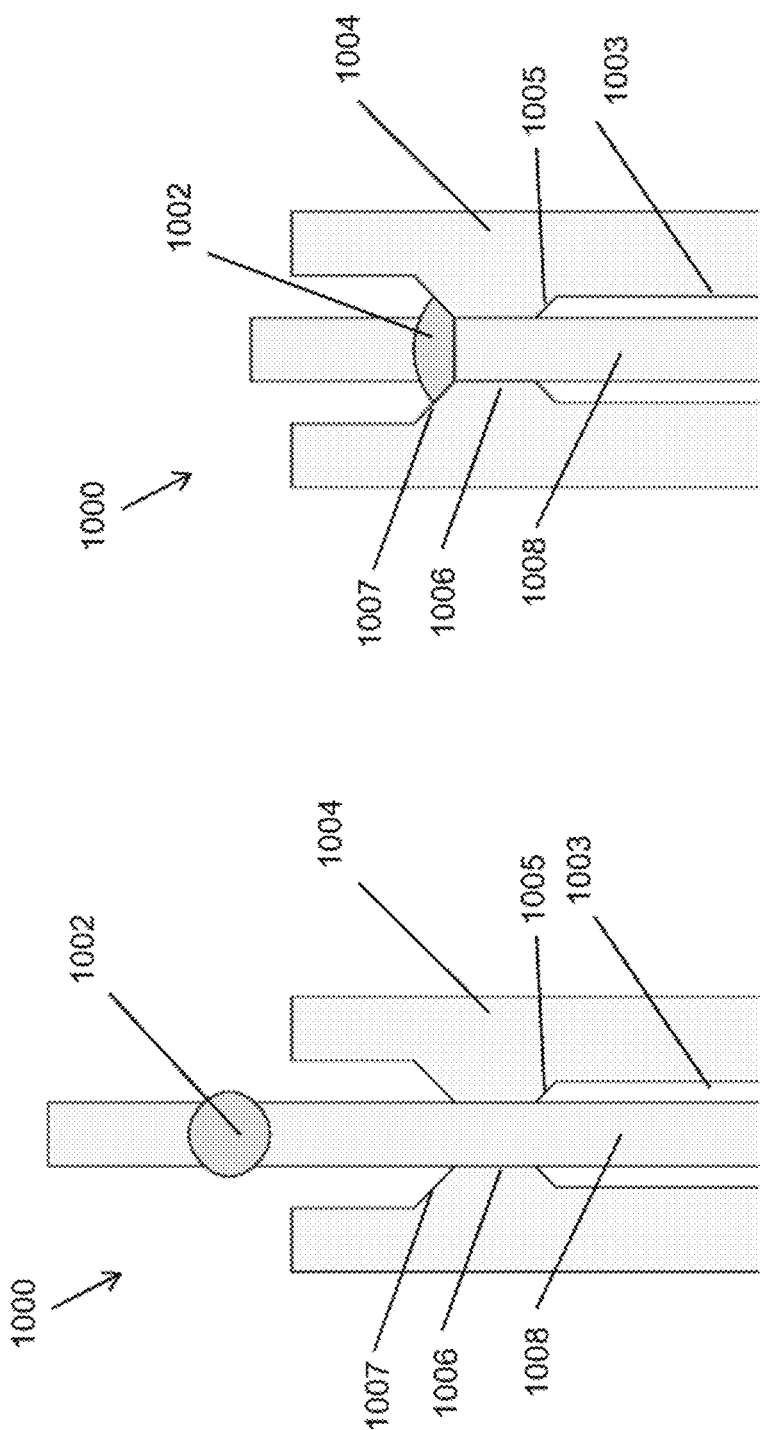

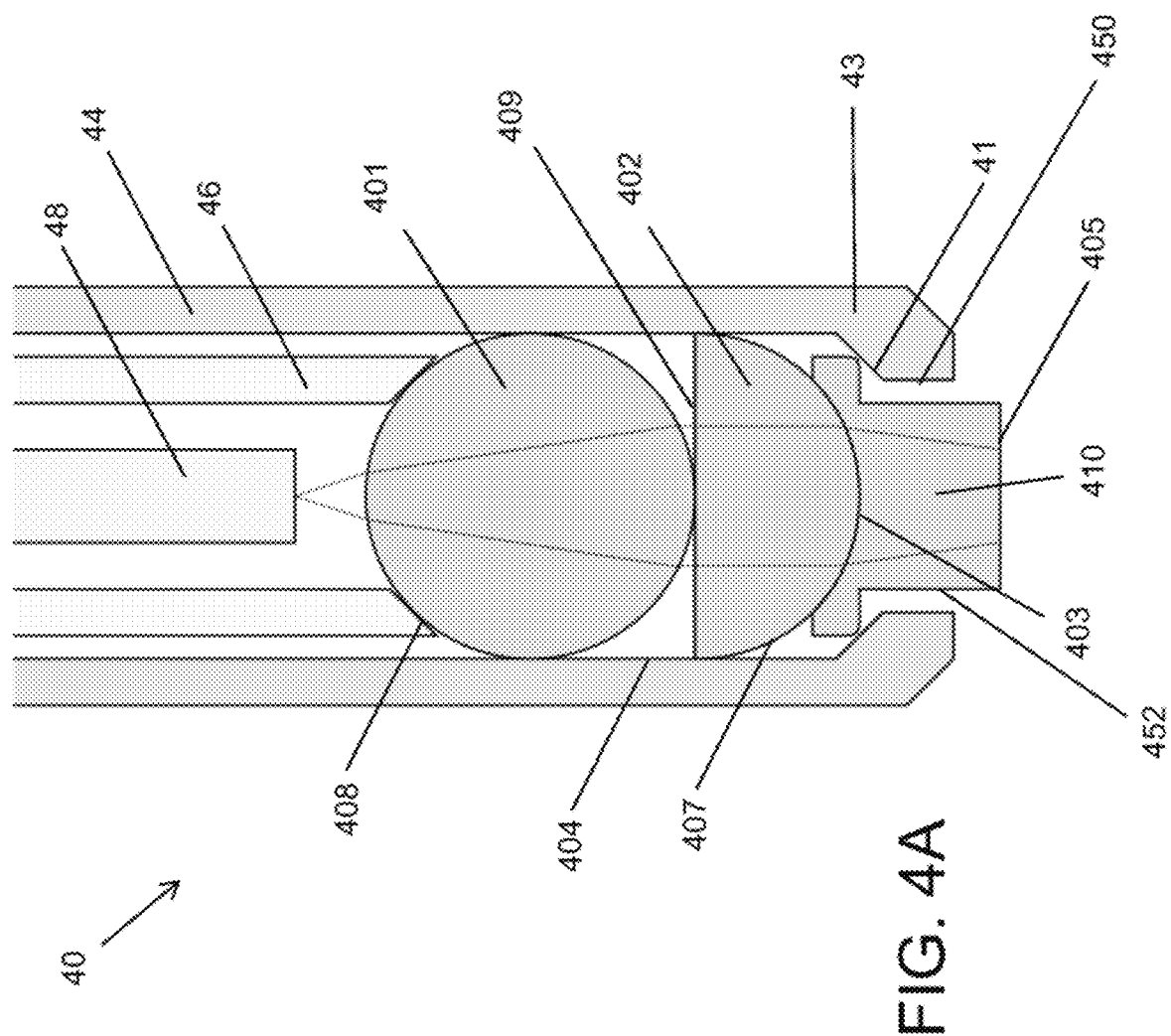

FIBER OPTIC TEMPERATURE PROBE

TECHNICAL FIELD

The following relates to devices used to measure temperature, particularly to fiber optic temperature probes.

BACKGROUND

Fiber optic temperature sensors, such as temperature probes, normally include an optical fiber which can deliver light to a sensing material (e.g., phosphor). The light illuminates the phosphor which, in turn, luminesces visibly. The temperature of the phosphor can be determined by observing the changes in certain characteristics of the emitted light. Differences in temperature between the phosphor and the surface to be measured (i.e., the target surface) can create difficulties in calibrating the sensor to obtain accurate measurements.

Generally, a fiber optic temperature probe includes a base and a single tube extending therefrom within which an optical fiber is positioned. A sensing tip including the sensing material is attached to an end of the tube so as to contact the target surface. The tube is intended to provide the probe with mechanical strength and resistance to environmental conditions, while ideally reducing heat loss from the tip to maintain the sensing material as close to the temperature of the target surface as possible. In a process such as semiconductor processing, which can involve etching materials with corrosive chemicals under high temperature, the tube should be resistant to high temperatures and corrosion in addition to having the above qualities, making material selection challenging.

The optical fiber is typically connected by means such as glue to the inside of the probe shaft at multiple points along the length thereof. The optical fiber can weaken or break when subjected to large temperature changes, particularly when connected at multiple points to a material with a different coefficient of thermal expansion.

Additionally, temperature probes typically include tips that are rigidly aligned with their target surface and thus there is often a small angle preventing flush contact between the surfaces, particularly when a smooth, solid surface is being measured. Poor contact between the target surface and the tip of the sensor can reduce the rate of heat transfer between the target surface and the sensing material inside the tip, thereby slowing or offsetting temperature measurements.

In view of the foregoing, it is desirable to provide a fiber optic temperature probe that addresses one or more of the above-noted issues or drawbacks.

SUMMARY

In one aspect, there is provided a fiber optic temperature probe comprising: a base; a first tube having a proximal end and a distal end, the proximal end being connected to the base; a second tube provided coaxially within the first tube; a probe tip having a first end and a second end, the first end being contained within the distal end of the first tube and the second end extending through an opening in the distal end of the first tube; and an optical fiber extending from within the base through an opening in the proximal end of the first tube and being substantially coaxial with respect to the first tube, the optical fiber being in optical communication with the probe tip.

A fiber optic temperature probe comprising: a base; a first tube having a proximal end and a distal end, the proximal end being connected to the base; a probe tip having a first end and a second end, the first end being contained within the distal end of the first tube and the second end extending through an opening in the distal end of the first tube; an optical fiber extending from within the base through an opening in the proximal end of the first tube and being substantially coaxial with respect to the first tube; and a first lens positioned between the probe tip and the optical fiber, wherein the optical fiber is in optical communication with the probe tip via the first lens.

BRIEF DESCRIPTION OF THE DRAWINGS

Embodiments will now be described with reference to the appended drawings wherein:

FIG. 3A is a cross-sectional view showing the components of an assembly for loosely fastening an optical fiber within a temperature probe.

FIG. 3B is a cross-sectional view of the assembly of FIG. 3A wherein the optical fiber is fastened to a chamfered tube.

FIG. 4A is a cross-sectional view of a self-aligning tip assembly having a ball lens and a half ball lens.

DETAILED DESCRIPTION

One or more of the terms "vertical", "vertically", "horizontal", "horizontally", "top", "bottom", "upwardly", "downwardly", "upper" and "lower" are used throughout this specification. It will be understood that these terms are not intended to be limiting. These terms are used for convenience and to aid in describing the features herein, for instance as illustrated in the accompanying drawings.

The term "moderate thermal conductivity" would be understood to those skilled in the art, but for illustrated purposes may be used herein to refer to a range of approximately 2 W/m-K to about 80 W/m-k. Similarly, the term "low thermal conductivity" may be used to refer to a range of about 2 W/m-k or less, and the term "high thermal conductivity" may be used to refer to a range of about 80 W/m-k or higher.

Dual Tubing and Spring Assembly

Fiber optic temperature probes used in chambers for etching processes generally include an outer tube made from alumina, primarily due to alumina's high resistance to etching. While alumina is resistant to etching, its high thermal conductivity compared to plastics, such as polyether ether ketone (PEEK), presents a considerable challenge in minimizing heat transfer away from a sensing material in the tip of a fiber optic temperature probe.

Figure 1:
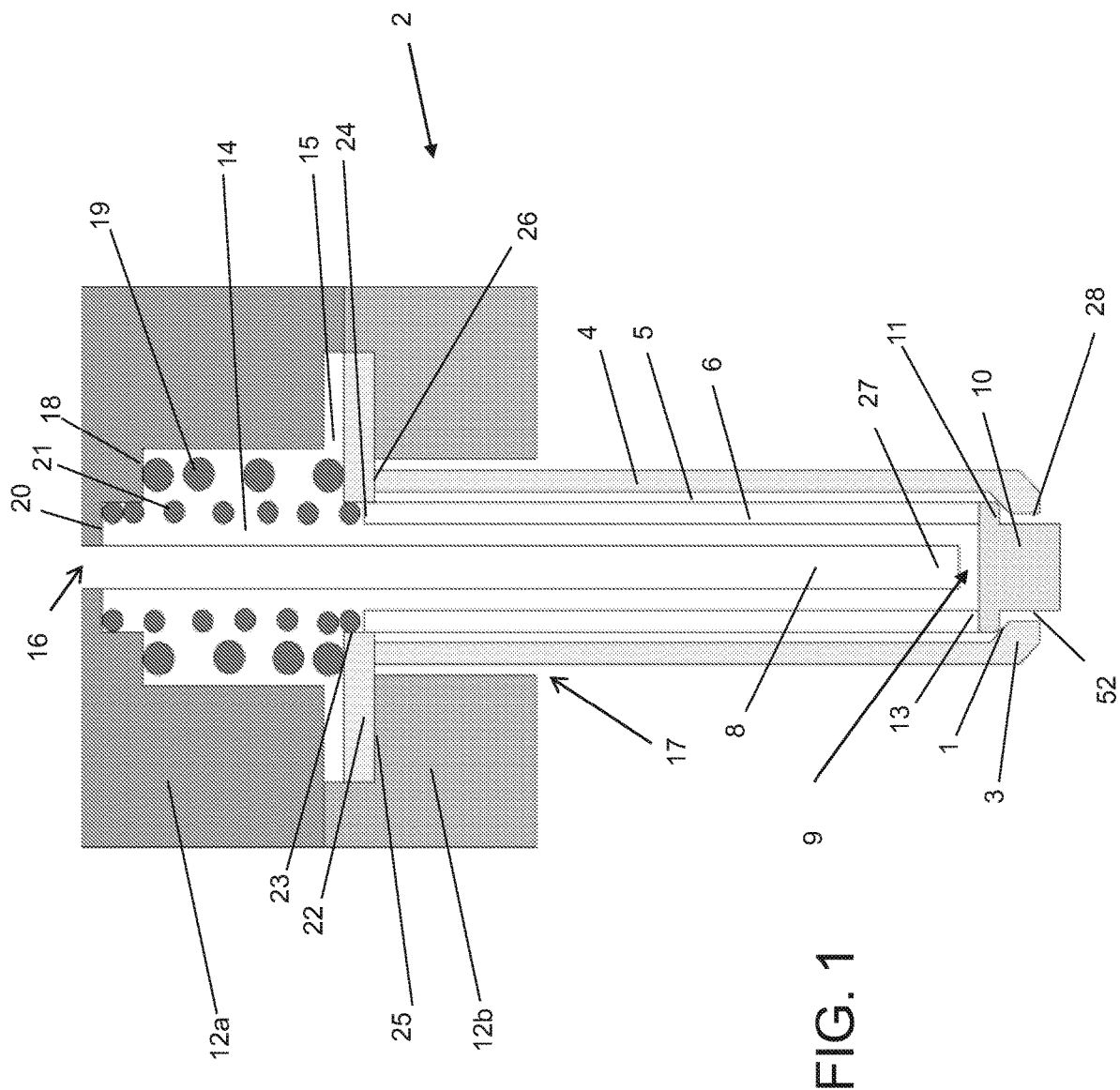
FIG. 1 is a cross-sectional view of a fiber optic temperature probe having a dual tubing and spring assembly.

Turning now to the figures, FIG. 1 illustrates a fiber optic temperature probe 2 comprising an outer tube 4, an inner tube 6, an optical fiber 8, a sensing tip 10, an upper housing 12a and a lower housing 12b. The upper housing 12a and the lower housing 12b can be collectively referred to hereinafter as housing 12. A biasing chamber 14 is defined in the housing 12 and surrounds a length of the optical fiber 8. The biasing chamber 14 includes an annular slot 15 adapted to contain, with axial play, a flange 22 which is connected to a first, or upper end 26 of the outer tube 4.

A first, or upper end 24 of the inner tube 6 is slidably retained within the outer tube 4 by an inner surface 23 of the flange 22. The sensing tip 10 is connected to a second, or lower end 13 of the inner tube 6. The sensing tip 10 includes a collar 11 which is biased toward and against an angled surface 1 defined within a second, or lower end 3 of the outer tube 4. The tip 10 includes a side(s) 52 which can pass through a gap in the lower end 3 defined by an inner surface 28. In the example illustrated in FIG. 1, a biasing force is created by an inner spring 21 disposed about the optical fiber 8 and within the biasing chamber 14. The inner spring 21 abuts an inner shoulder 20 and extends toward and pushes against the upper end 24 of the inner tube 6. This, in turn, urges the collar 11 against the angled surface 1. The inner tube 6 is positioned and retained within the outer tube 4 in the manner discussed above such that an outer annular space 5 can be maintained therebetween. In this way, contact area between the tubes is minimized or even inhibited or eliminated, thereby reducing heat transfer from the inner tube 6 to the outer tube 4 to the housing 12 (i.e., reducing heat loss from the tip 10). Additionally, when a force is applied on the probe to push the inner tube 6 against the target surface, until the lower end of the outer tube 4 contacts the target surface, the collar 11 can move toward the housing 12 independently of the outer tube 4, thereby moving away from the angled surface 1. This, in turn, can further reduce heat transfer from the inner tube 6 to the outer tube 4.

An opening 16 in the upper housing 12a is adapted to slidably receive the optical fiber 8. The optical fiber 8 is positioned within the inner tube 6 such that a gap, or space 9 exists between a lower end 27 of the optical fiber 8 and the sensing tip 10. In one suitable example, the space, or gap 9 is approximately 0.25 to 1.5 mm. It can be appreciated by a person skilled in the art that the size of this gap 9 (i.e., the distance between the lower end 27 and the tip 10) can vary based on, inter alia, the power of the light source (not shown). Although various types of optical fiber would be known to a person skilled in the art, in a preferred embodiment, the optical fiber 8 includes one or more fused silica fibers with silica cladding. While various sizes of fibers would be known, in an example embodiment, the fiber 8 has a 1 mm diameter.

Optionally, as shown in FIG. 1, an outer spring 19 can be provided around the inner spring 21 and within the biasing chamber 14. The outer spring 19 extends between and exerts a force on an outer shoulder 18 and the flange 22, thereby biasing the axially movable flange 22 toward the opening 17 and against a lower surface 25 of the annular slot 15.

The outer tube 4 can be made from alumina, which has a moderate thermal conductivity and is resistant to high temperatures and corrosive environments, such as those in semiconductor deposition chambers containing plasma and other chemicals such as fluorine. It will be appreciated that other materials having such characteristics could be used. The inner tube 6 can be made from a material having a lower thermal conductivity than the outer tube 4, e.g., quartz., to reduce heat loss from the tip 10.

The tip 10 can be made from a thermally conductive material containing a sensing material, e.g., aluminum nitride containing phosphor. Application or bonding of the sensing material onto the thermally conductive material can be carried out using methods including, but not limited to, deposition, sputtering, bonding, panting, and spin on. These and other methods of bonding the sensing material to the aluminum nitride are well known to those skilled in the art.

A temperature probe having a double tubing and spring configuration such as that discussed with respect to FIG. 1 can decrease heat loss from the tip of the probe. As discussed above, lower heat loss from the tip can enable the temperature of the sensing material to be maintained at a temperature closer to that of the target surface. This, in turn can enable more accurate calibration of the probe 2 and thus more accurate temperature measurements.

It can be appreciated that the outer tube can be made from other materials having useful characteristics normally unavailable in materials having low thermal conductivity (e.g., ceramics). For instance, the outer tube can be made from a material having high strength for applications where the temperature probe can be subjected to high applied stresses, such as compressive stresses.

Probe Including Tip Holder—for Increasing Area in Contact with Target Surface

Temperature probes are typically designed to maximize the area of the tip in contact with the target surface, while minimizing the volume of the tip material to ultimately reduce the thermal mass thereof. This, in turn, can increase the speed with which the sensing material responds to temperature changes of the target surface. However, when the target surface is smooth and hard, the mechanical design of the mount being used can prevent repeatable alignment of the probe, and the temperature is high enough that rigid materials such as ceramics or metals are used, contact area between the target surface and the sensor tip may be small or inconsistent when using such probes.

Figure 2:
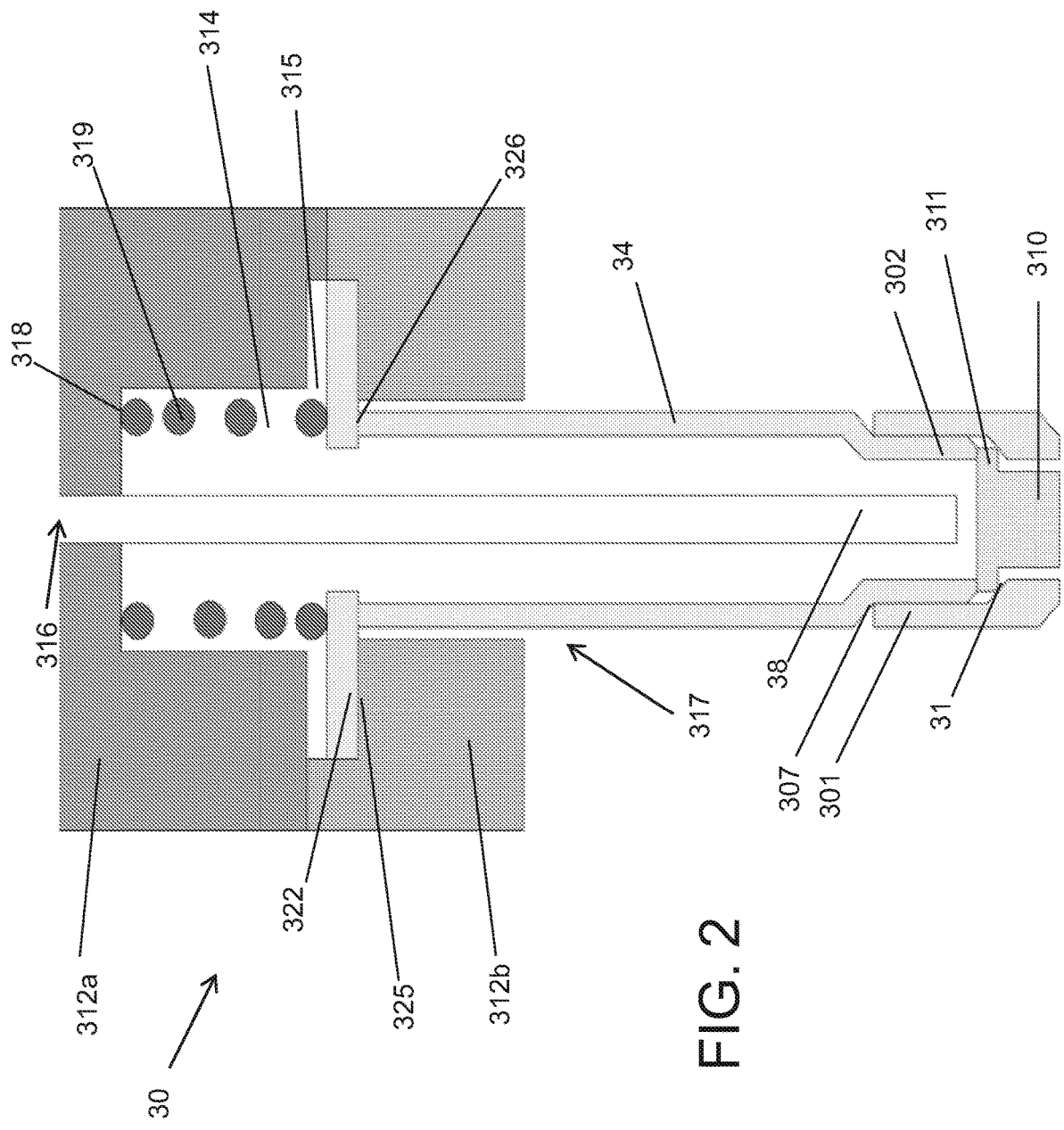
FIG. 2 is a cross-sectional view of a fiber optic temperature probe having a tip holder for increasing contact area.

The probe discussed with respect to FIG. 2 includes a tip holder designed to contact the target surface in addition to the tip itself, creating a second path for heat to flow from the target surface to the sensing material. The tip holder can increase the thermal mass of the material transferring heat between the target surface and the sensing material, thereby decreasing the speed with which the sensing material responds to temperature changes of the target surface. However, providing an additional point of contact (i.e., the tip holder) between the probe and the surface can enable more consistent, sufficient contact between the probe and the target surface to, and can thus outweigh the drawback of, decreased sensing material response speed.

Turning to FIG. 2, depicted is a fiber optic temperature probe 30 that is similar in structure to the temperature probe 2 discussed above. Similar elements are therefore identified with the same reference characters used when discussing the temperature probe 2, but with the prefix "3" added.

The temperature probe 30 comprises a tube 34, optical fiber 38, a sensing tip 310, an upper housing 312a and a lower housing 312b (collectively housing 312). The tube 34, sensing tip 310 and optical fiber 38 can include or be made from materials such as those discussed with respect to FIG. 1. A biasing chamber 314 is defined in the housing 312 and partially surrounds the optical fiber 38 which extends through the housing through an opening 16 in the housing. The biasing chamber 314 includes an annular slot 315 adapted to contain a flange 322 which is connected to a first, or upper end 326 of the outer tube 34. The outer tube 34 and the optical fiber extend out of an opening 316 in the lower housing 312b to be exposed to an environment such as a semiconductor deposition chamber.

Optionally, as shown in FIG. 2, a spring 319 can be disposed within the biasing chamber 314 and around the optical fiber 38. The spring 319 extends between and exerts a force on an outer shoulder 318 and the flange 322, thereby biasing the axially movable flange 322 toward a lower surface 325 of the annular slot 315 and counters forces exerted on the tip 310 and tube 34 when the probe 30 is being used.

The sensing tip 310 is connected to a lower, narrowed end 302 of the tube 34. A tip holder 301 is connected to the lower end 302 by means such as, for example, ceramic adhesive or a screw, or the shown angled surface 307. The tip holder 301 can be made from a material having a moderate thermal conductivity such as alumina. The assembly 317 can move with respect to the housing 312, and the tip 310 and/or the tip holder 301 can contact the target surface (i.e., the surface to be measured). Similar to FIG. 1, the tip 310 can include a collar 311 which is biased toward and rests against an angled surface 311 to limit the extent the tip 310 can extent out of the narrow end 12. The additional contact area from the tip holder 301 can increase the heat flow between the target surface and the sensing material within the tip holder 301. For instance, if the longitudinal axis of the assembly 317 is not perpendicular with respect to the target surface and the tip 310 is not contacting the target surface, the tip holder 301 can still be in contact with same such that temperature probe 30 can continue obtaining temperature readings.

Although the flange 322 is depicted as having space to move axially within the annular slot 315, it will be understood that the flange 322 and/or annular slot 315 can be sized such that the flange 322 is retained firmly within the annular slot 315. In such case, spring 319 can be omitted.

By providing a temperature probe with a tip holder such as that discussed with respect to FIG. 2, the contact area between the tip holder and a target surface can create an additional, or supplemental heat flow path from the target surface to a sensing material in the probe tip. As will be appreciated by those skilled in the art, such a configuration can mitigate difficulties commonly encountered when measuring the temperature of a smooth, hard target surface in high temperature environments (where rigid materials are often used), particularly when the probe is being repeatedly mechanically mounted and dismounted.

It can be appreciated that such a tip holder can be incorporated into other fiber optic temperature probes provided herein, such as the dual/tubing spring assembly shown in, e.g., FIG. 1. One way in which the tip holder can be included the dual/tubing spring assembly is to shape the inner tube similar to the outer tube shown in FIG. 2 and attach the tip holder thereto.

Assembly for Loosely Fastening an Optical Fiber within a Temperature Probe

Figure 3C:
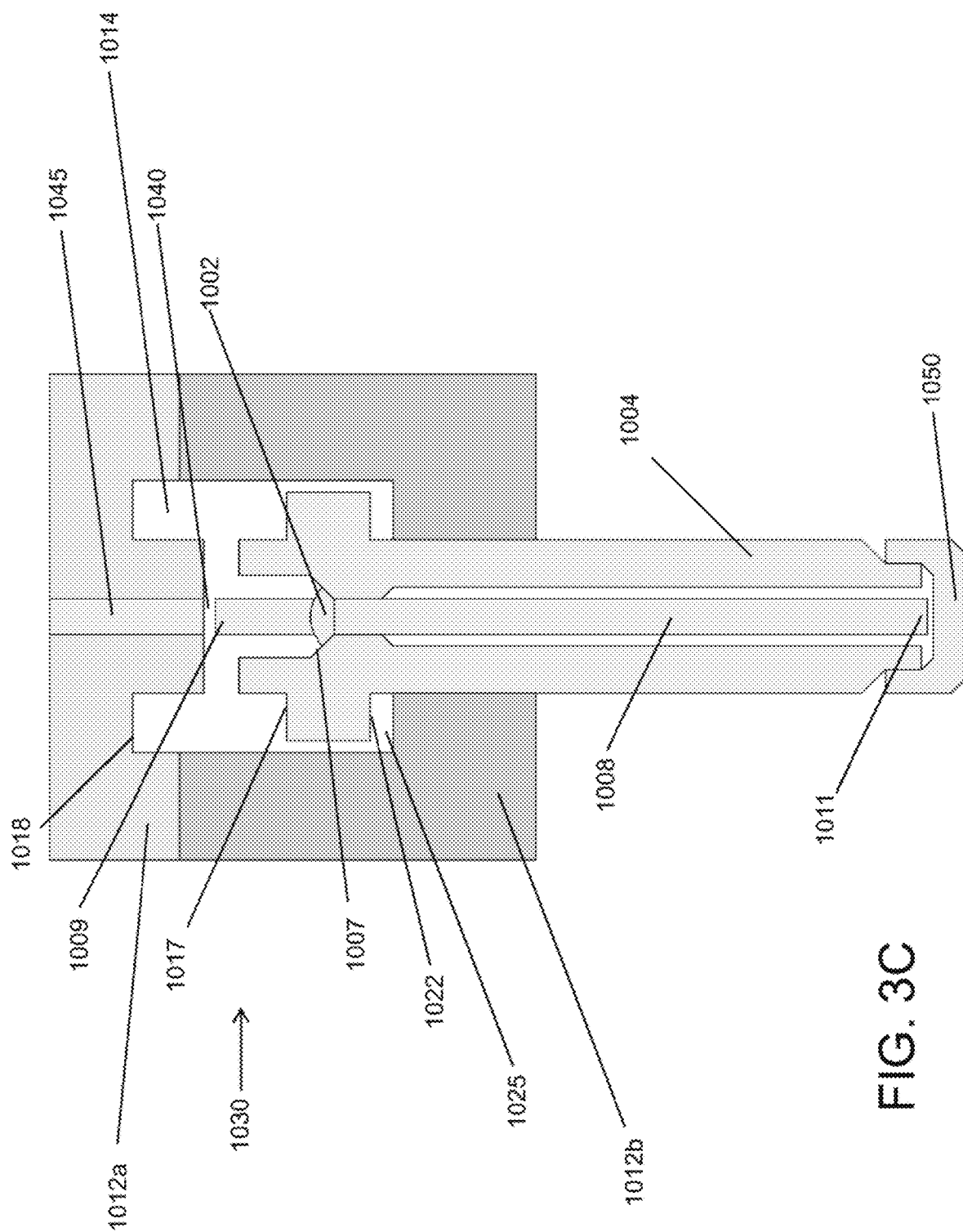
FIG. 3C is a cross-sectional view of a temperature probe having a loosely fastening optical fiber positioned therein in the manner shown in FIG. 3B.

FIGS. 3A and 3B illustrate an assembly 1000 for holding an optical probe 1008 in place in a fiber optic temperature probe. FIG. 3C illustrates a fiber optic temperature probe 1030 including the assembly 1000. It will be appreciated that the assembly 1000 or a similar assembly can be incorporated into temperature probes such as, for example, temperature probes 2 and 30 described above.

The assembly comprises a chamfered tube 1004 including a chamfered, or narrowed section 1006 having lower and upper angled surfaces 1005 and 1007, respectively. A portion of glue 1002 is provided on the optical fiber 1008. The narrowed section 1006 can have an inner diameter large enough to allow the optical fiber 1008 to be inserted therethrough but small enough to prevent the glue 1002 from passing therethrough. It can be appreciated that the narrowed section 1006 can be sized to accommodate optical fibers of various sizes for the aforementioned purpose. The operation of the assembly is discussed below.

First, as shown in FIG. 3A, the optical fiber 1008 is partially inserted into the tube 1004, having an inner diameter 1003 such that the fiber 1008 can pass into tube 1004. Next, the portion of glue 1002 is applied to the optical fiber 1008 at a point that has not yet entered the tube 1004. Then, the insertion of the optical fiber 1008 into the tube 1004 continues until the glue 1002 abuts the upper angled surface 1007 and the glue 1002 is subsequently allowed to settle. Lastly, the glue 1002 is cured thereby fastening the optical fiber 1008 to narrowed section 1006, as shown in FIG. 3B, and within a temperature probe (not depicted).

The optical fiber 1008 is preferably attached to the chamfered tube 1004 at a point along the optical fiber 1008 as far as possible from the target surface so as to decrease the temperatures and/or temperature fluctuations experienced by the adhesives and sealing materials used to hold the fiber 1008 in place. It can be appreciated that applying adhesive in a lower and more stabilized temperature environment can allow the use of adhesives and sealing materials that would otherwise offgas or degrade.

Additionally, the optical fiber 1008 can break when subjected to thermal cycling, particularly when adjacent or connected to a material having a different coefficient of thermal expansion as is often the case in known fiber optic temperature probes. Applying adhesive at one end of the optical fiber 1008 to support same can mitigate the aforementioned issue by allowing the fiber to expand and contract without resistance from multiple connection points, thereby reducing the stress applied to the optical fiber. The adhesive, or glue can be, for example, epoxy. The optical fiber 1008 can be mounted at a proximal end thereof (i.e., at a point above the glue 1002) to a plate with a controlled temperature. The optical fiber 1008 can be made of materials including, but not limited to ceramic materials and can extend to within a few millimeters or less of the sensing material inside the tip (not shown) which can be made from the same materials as the optical fiber 1008.

Turning to FIG. 3C, the assembly 1000 is incorporated into the fiber optic temperature probe 1030. A lower end 1011 of the optical fiber 1008 is suspended above a phosphor coated tip 1050 to convey a temperature dependent optical signal therefrom to an upper end 1009 of the optical fiber 1008. The temperature dependent optical signal can pass from the upper end 1009 to another optical fiber 1045, via a gap 1040 formed therebetween. The gap 1040 can provide room for the upper end 1009 to move substantially freely, thereby reducing stresses on the optical fiber 1008.

The other optical fiber 1045 is positioned within an upper base portion 1012*a*. The upper base portion 1012*a* and a lower base portion 1012*b* include a biasing chamber 1014 similar to that discussed above. A biasing member (not shown), such as a spring, can be positioned between an upper base shoulder 1018 and an upper shoulder 1017 formed on the chamfered tube 1004. This, in turn, can urge a lower shoulder 1022 formed on the chamfered tube 1004 toward a lower base shoulder 1025.

Self-Aligning Tip Having One or More Half-Ball or Ball Lenses

In a conventional temperature probe, the sensing tip is held rigidly in place within the probe shaft (i.e., such that the tip cannot move or rotate with respect to the shaft). Thus, if the shaft is not substantially perpendicular with respect to the target surface, there can exist a small contact angle between the bottom surface and the target surface. When such a contact angle exists, a portion of the bottom surface of the tip may not be in contact with the target surface, thereby resulting in a lower rate of heat transfer as compared to if the tip were flush with the target surface. This, in turn, can slow or offset temperature measurements. In contrast, a self-aligning tip could rotate within the shaft of the probe to conform to the target surface to achieve flush or near-flush contact with the target surface in order to maximize the rate of heat transfer therebetween. A number of embodiments for such self-aligning tips are discussed below.

Figure 4B:
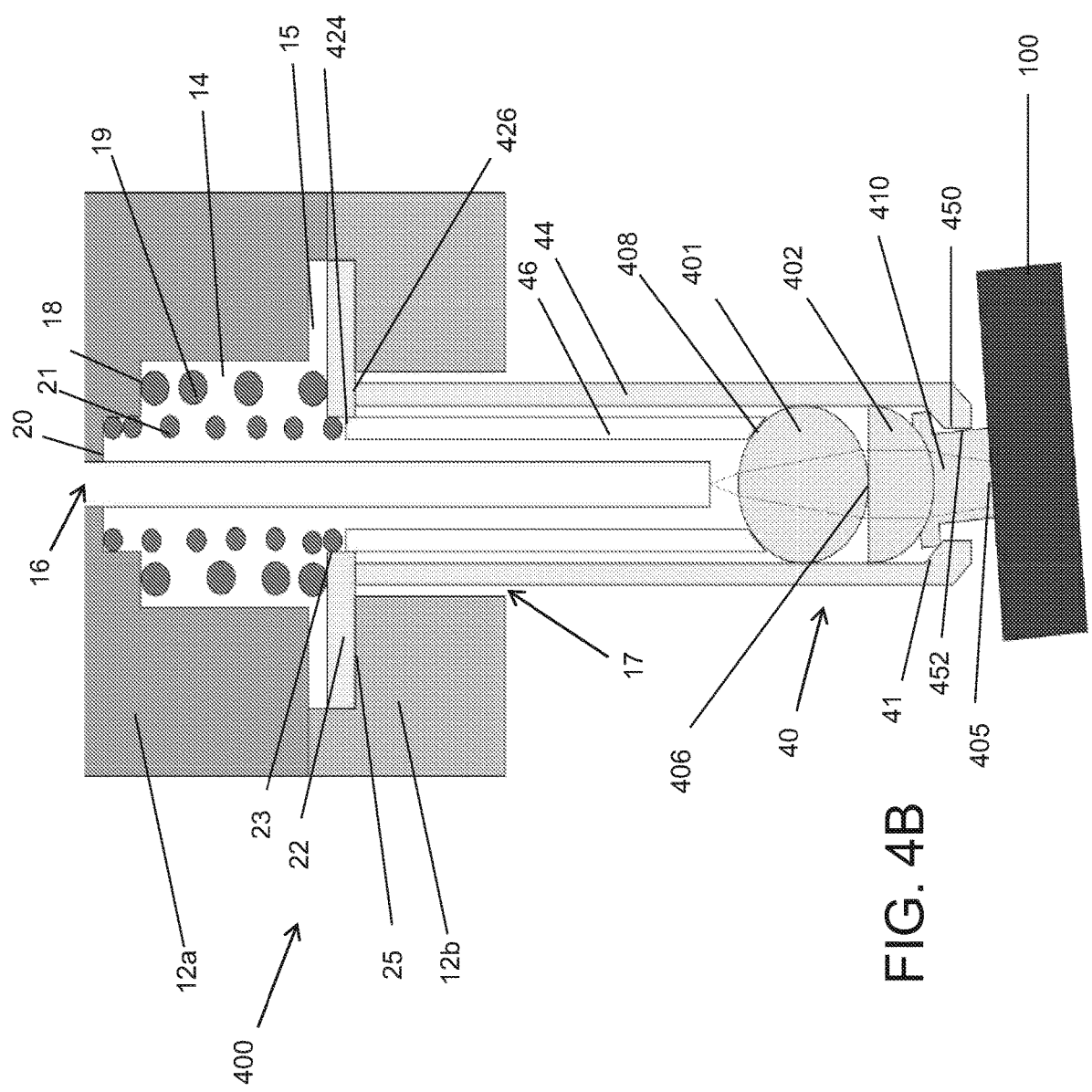
FIG. 4B is cross-sectional view of the self-aligning tip assembly shown in FIG. 4A incorporated in a fiber optic temperature probe.
Figure 4C:
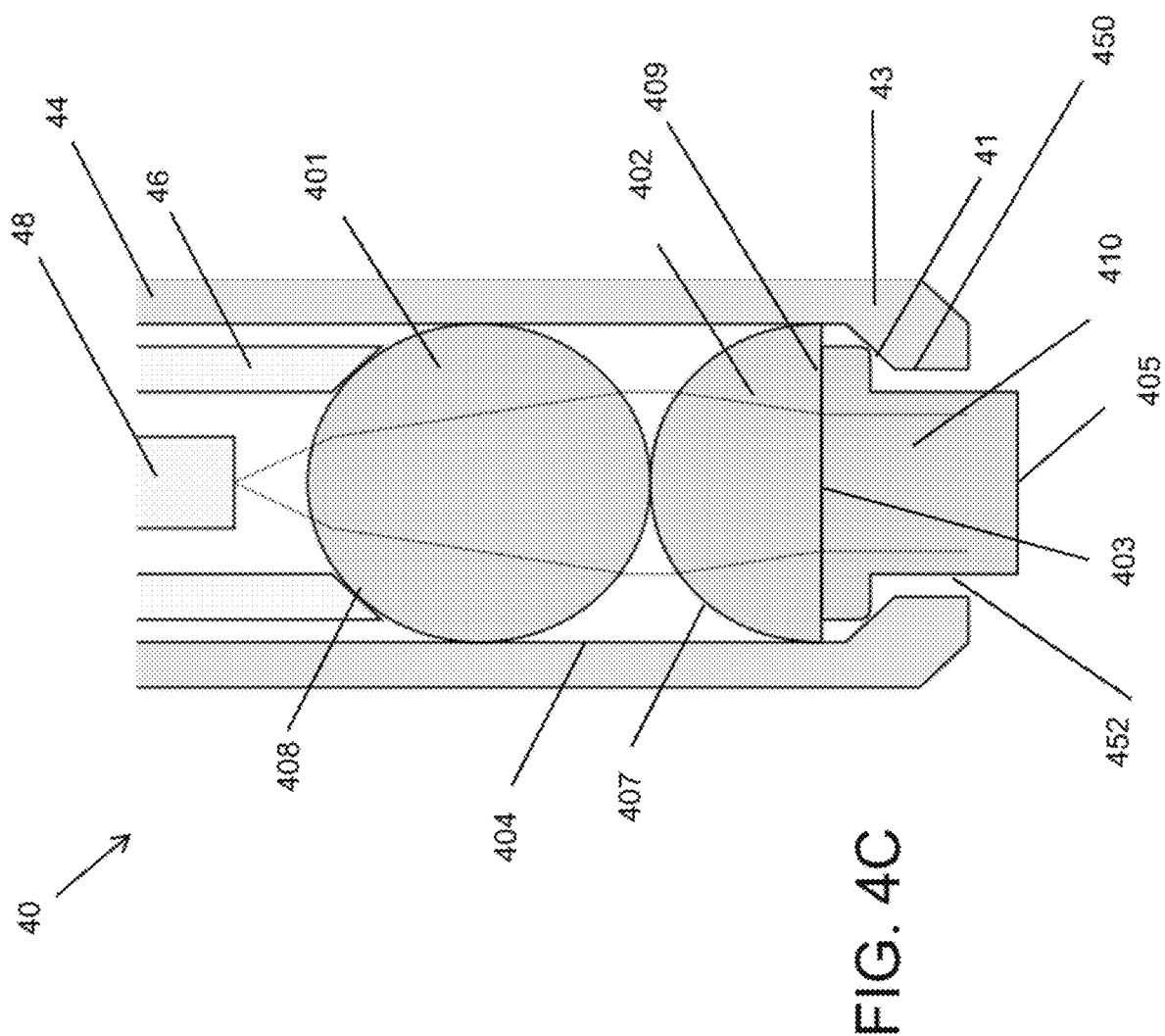
FIG. 4C is a cross-sectional view of the self-aligning tip assembly of FIG. 4A wherein the orientation of the half ball lens has been reversed.

FIGS. 4A and 4C depict a self-aligning tip assembly 40. The tip assembly 40 includes a number of elements that are similar in structure to those in the temperature probe 2 discussed above. Similar elements are therefore identified with the same reference characters used when discussing the temperature probe 2, but with the prefix "4" added.

Turning to FIG. 4A, the tip assembly 40 comprises an optical fiber 48, inner tube 46, outer tube 44 and sensing tip 410. However, in this example, a ball lens 401 and a half-ball lens 402 are disposed within the outer tube between the inner tube 46 and the sensing tip 410. A curved surface 407 in the half-ball lens 402 can be seated within a concave or "cup-shaped" surface 403 formed in the tip 410 which is, in turn, supported by an angled surface 41 in a lower end 43 of the outer tube 44. The first ball lens 401 can be contained between the second, half-ball lens 402 and an angled surface 408 which can be defined in the inner tube 46. The ball lens 401 and half-ball lens 402 can be sized to have approximately the same maximum diameter as an inner diameter of an inner surface 404 of the outer tube 44. The cup-shaped surface 403 can glide over and rotate on the curved surface 407, and/or the flat surface 409 can pivot with respect to the ball lens 401. That is, the ball lens 401 can function as a bearing. Thus, the bottom surface 405 of the tip 410 can at least partially conform to a target surface, particularly when a longitudinal axis defined by the outer tube 44 is not perpendicular to the target surface. As shown, the tip 410 can pivot within the limits provided by an inner surface 450 of the lower end 43 of the outer tube 44. That is, side 452 can travel until abutting any point on the inner surface 450.

The ball-lens 401 and the half-ball lens 402 can be constructed from materials that are resistant to high temperatures (e.g., about 400° C. to about 700° C.) and/or resistant to corrosion. For example, the ball-lens 401 and the half-ball lens 402 can be constructed or formed from materials including, but not limited to, sapphire, which is resistant to corrosion, and fused silica, which has high working and melting temperatures. The ball-lens 401 and the half-ball lens 402 can focus or collimate light from the optical fiber 48 onto the sensing material on the sensing tip 410, and back to the optical fiber 48. A complete or partial seal can be formed between the tip 410 of the sensor and the cup-shaped surface 403, whereby corrosive materials from the external environment can be prevented from contacting, through the curved surface 407, the sensing material coated onto and/or within the tip 410. The ball lens 401 and/or the half-ball lens 402 may optionally be sized to contact the inner surface 404 of the outer tube 44 to seal or partially seal the inner tube 46 and the outer tube 44 from corrosive materials. It will be understood that the above principles can apply to the example embodiments discussed below.

Depicted in FIG. 4B is a fiber optic temperature probe 400 including the self-aligning tip assembly 40 discussed above. The housing 12 comprises similar elements to those discussed with respect to FIG. 1, thus, for consistency, the reference characters of such elements are repeated.

As shown, a target surface 100 in this example environment is not perpendicular with respect to the longitudinal axis of the outer tube 44, but the bottom surface 405 of the tip 410 is in contact with and substantially parallel to the target surface 100. In the manner discussed with respect to FIG. 1, the inner and outer springs 21 and 19 can bias the inner tube 46 and the outer tube 44, respectively, toward the surface 100. However, in this instance, the inner tube 46 is urged by the inner spring 21 against the ball lens 401 (instead of directly against the tip 10), which, in turn, pushes on the half ball lens 402 at a contact surface(s) 406. The half ball lens 402 urges against the tip 410 which is support by the angled surface 41. It will be understood that the springs 21 and 19 are optional and alternative biasing mechanisms may be used. In another example embodiment, no biasing mechanisms are included.

FIG. 4C illustrates the self-aligning tip assembly 40 wherein the orientation of the half-ball lens 402 has been reversed. Thus, the curved surface 407 supports the ball lens 401. In this configuration, the tip 410 can move as half ball-lens 402 rotates over the ball lens 401, thereby allowing the bottom surface 405 to at least partially conform to a target surface.

Figure 5:
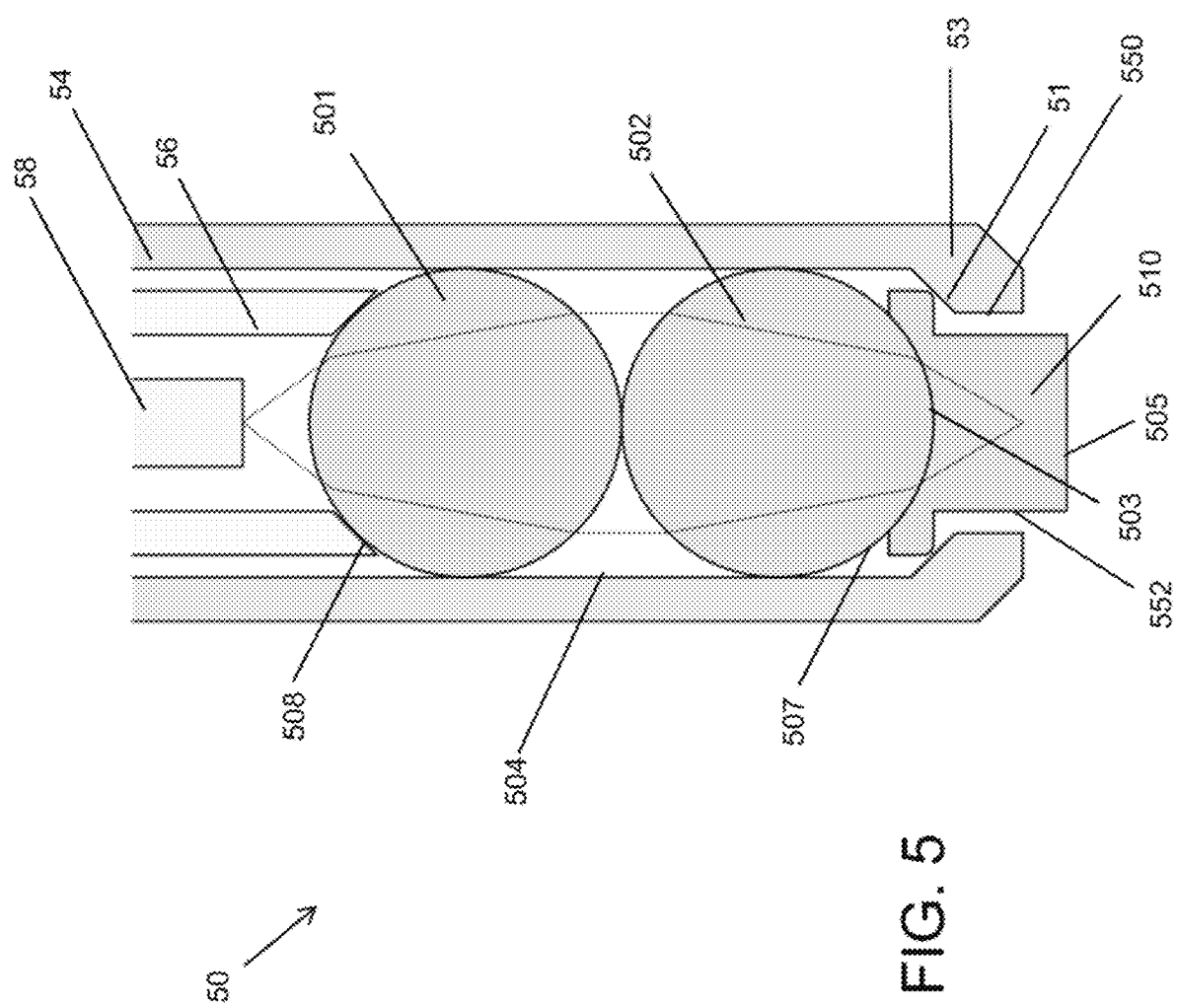
FIG. 5 is a cross-sectional view of a self-aligning tip assembly having two ball lenses.

FIG. 5 illustrates a self-aligning tip assembly 50 similar to the tip assembly 40 shown in FIG. 4C, however, tip assembly 50 includes a second ball lens 502 on a sensing tip 510, instead of a half-ball lens. The tip assembly 50 includes a number of elements that are similar in structure to those in temperature probe 2 discussed above. Similar elements are therefore identified with the same reference characters used when discussing the temperature probe 2, but with the prefix "5" added.

Continuing with FIG. 5, a first ball lens 501 and the second ball lens 502 are disposed within an outer tube 54 between an inner tube 56 and a sensing tip 510. A curved surface 507 of the second ball lens 502 sits against a cup-shaped surface 503 formed in the tip 510 which is, in turn, supported by an angled surface 51 in a lower end 53 of the outer tube 54. The first ball lens 501 can be contained between the second ball lens 502 and an angled surface 508 defined in the inner tube 56. The ball lenses 501 and 502 can be sized to have approximately the same diameter as an inner diameter of an inner surface 504 of the outer tube 54 to contain and constrain the movement and rotation of the ball lenses 501 and 502. The cup-shaped surface 503 can glide over and rotate on the curved surface 507 and/or can move with the curved surface 507 as the second ball lens 502 rotates. In this way, the bottom surface 505 of the tip 510 can at least partially conform to a target surface, particularly when a longitudinal axis of the outer tube 54 is not perpendicular to the target surface (e.g., as illustrated in FIG. 4B). As shown in FIG. 5, the tip 510 can pivot within the limits provided by an inner surface 550 of the lower end 53 of the outer tube 54. That is, side 552 can travel until abutting any point on the inner surface 550.

Figure 6:
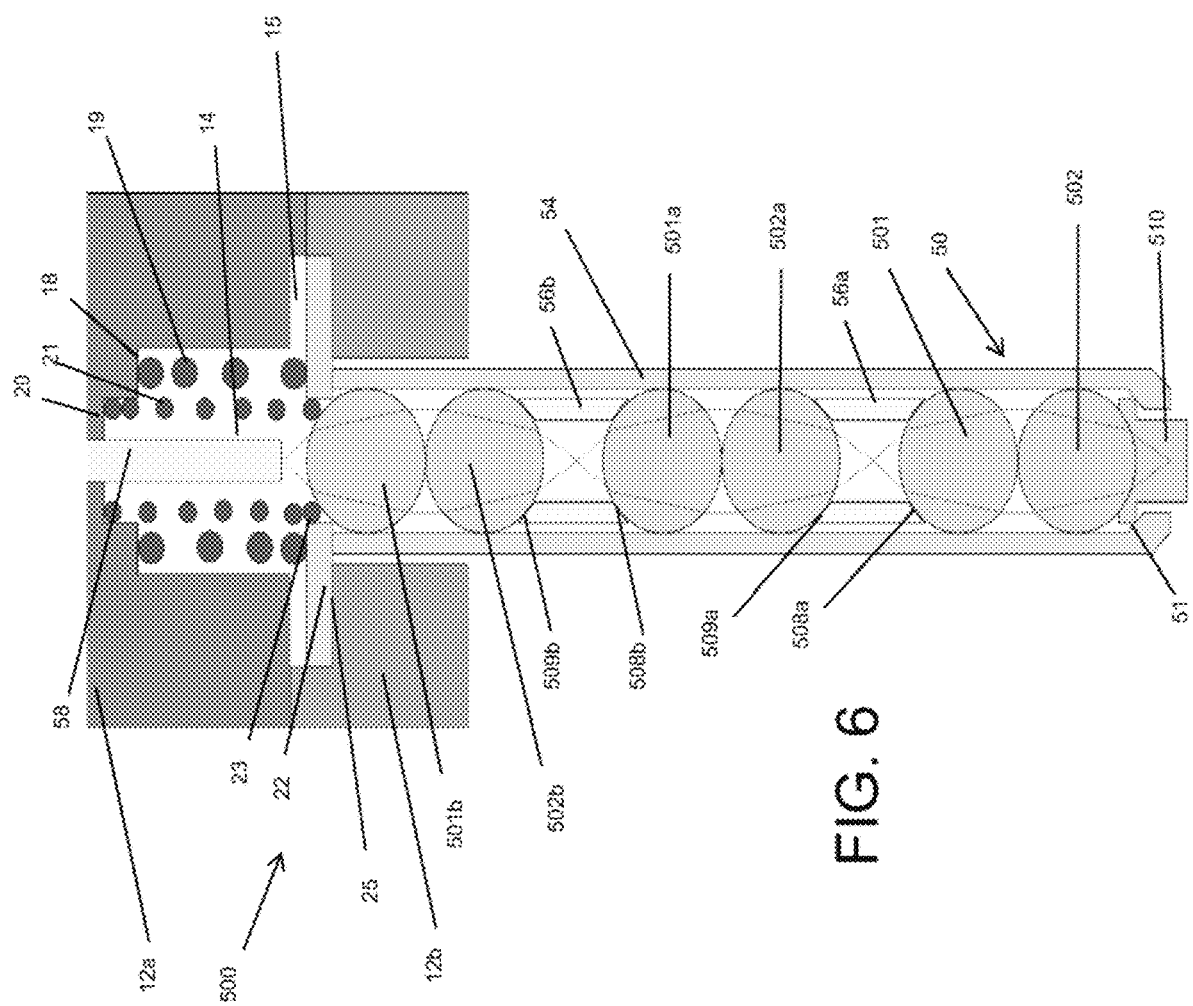
FIG. 6 is a cross-sectional view of a temperature probe including the self-aligning tip assembly shown in FIG. 5 wherein the optical fiber is displaced by four additional ball lenses separated by inner tube segments.

Depicted in FIG. 6 is a fiber optic temperature probe 500 including the self-aligning tip assembly 50 discussed above. The housing 12 comprises similar elements to those discussed with respect to FIG. 1, thus, for consistency, the reference characters of such elements are repeated.

The fiber optic temperature probe 500 comprises third, fourth, fifth and sixth ball lenses 502a, 501a, 502b, and 501b, respectively, which transmit and focus or collimate light from the optical fiber 58 to the sensing material on and/or within the tip 510 and back to the optical fiber 58. A first, or upper inner tube segment 56b and a second, or lower inner tube segment 56a are provided within the outer tube 54 and preferably coaxially thereto. The upper and lower inner tube segments 56b and 56a include upper angled surfaces 509b and 509a, respectively, and include lower angled surfaces 508b and 508a, respectively. As will be appreciated by a person skilled in the art, while three pairs of ball lenses are used in the probe 500 (501b and 502b, 501a and 502a, 501 and 502), any number of pairs of ball lenses can be used. Additionally, as shown starting from ball lens 501b (the first "odd" ball), the odd balls collimate the light into a parallel beam and the even balls focus the light. The distance between an odd ball and a subsequent, adjacent even ball can be less important because the light can be collimated therebetween. For example, in FIG. 6, the ball pairs are next to each other, but they can be spaced farther apart. The distance between an even ball and a subsequent, adjacent odd ball, on the other hand, can be important, and should be twice the focal length of the subject balls (focal points shown in FIG. 6).

In the manner discussed with respect to FIG. 1, the outer spring 19 can bias the outer tube 54, toward a target surface (not shown). However, in this case, the inner spring 21 pushes directly against the sixth ball lens 501b (i.e. the uppermost one) which, in turn pushes against the fifth ball lens 502b which is supported by the upper angled surface 509b. The lower angled surface 508b, can push against the fourth ball lens 501a which, in turn pushes against the third ball lens 502a, which is supported by the upper angled surface 509a. The lower angled surface 508a can push against the first ball lens 501 which, in turn pushes against the second ball lens 502. The second ball lens 502 pushes against the tip 510 in the manner discussed above, which is supported by the angled surface 51.

As shown in FIG. 6, the inclusion of ball lenses separated by inner tube segments can avoid the need to include an optical fiber 58 within the outer tube 54. It may be that positioning the optical fiber 58 at a greater distance from the sensing tip 510 can prolong the life of the optical fiber 58. It will be understood that the springs 21 and 19 are optional and alternative biasing mechanisms may be used. In another example embodiment, no biasing mechanisms are provided.

Figure 7:
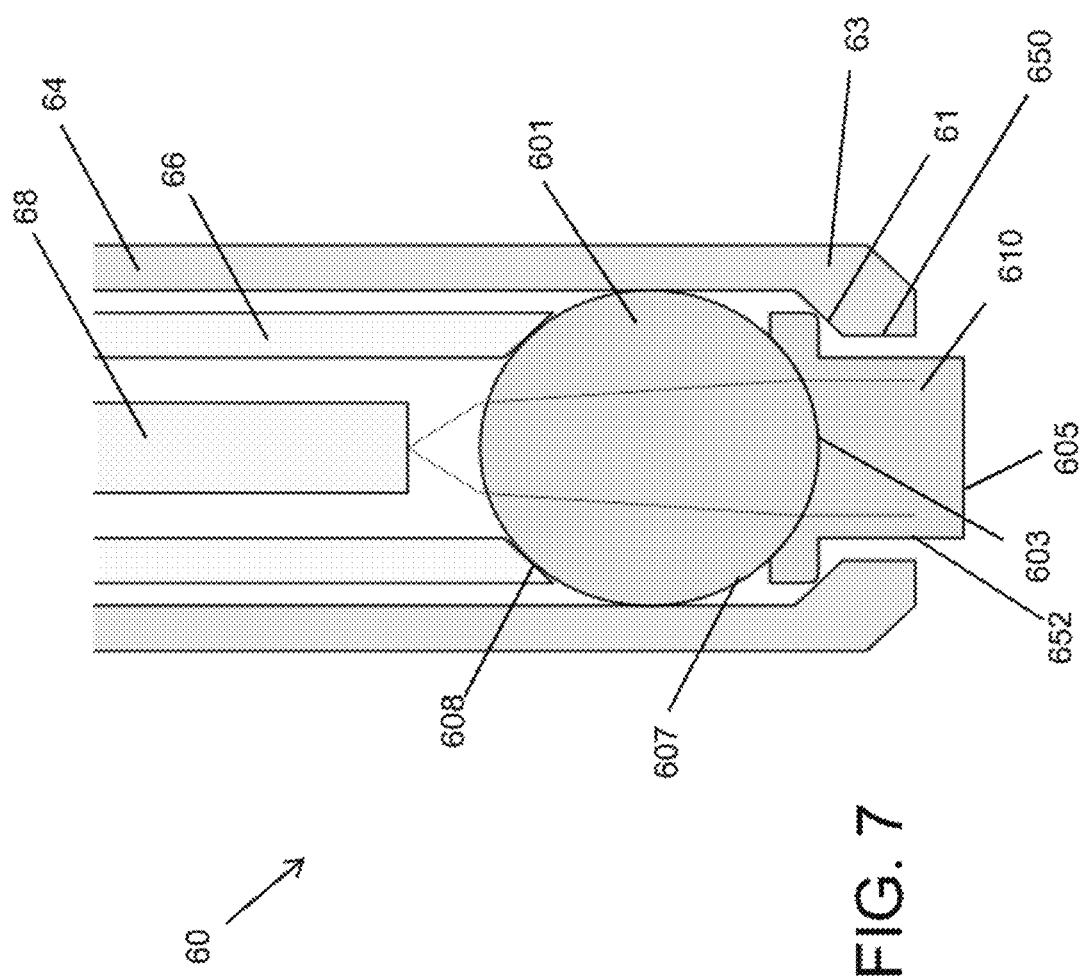
FIG. 7 is a cross-sectional view of a self-aligning tip assembly including a single ball lens.

FIG. 7 illustrates a self-aligning tip assembly 60 similar to the tip assembly 50 shown in FIG. 6, however, tip assembly 60 does not include a second ball lens. The tip assembly 60 includes a number of elements that are similar in structure to those in temperature probe 2 discussed above. Similar elements are therefore identified with the same reference characters used when discussing the temperature probe 2, but with the prefix "6" added.

Continuing with FIG. 7, a ball lens 601 is disposed within an outer tube 64 between an inner tube 66 and a sensing tip 610. A curved surface 607 in the ball lens 601 sits against a cup-shaped surface 603 formed in the tip 610 which is, in turn, supported by an angled surface 61 in a lower end 63 of the outer tube 64. The first ball lens 601 can be retained against the cup-shaped surface 603 by an angled surface 608 defined in the inner tube 66. The cup-shaped surface 603 can glide over and rotate on the curved surface 607 and/or can move with the curved surface 607 as the ball lens 601 rotates. In this way, a bottom surface 605 of the tip 610 can at least partially conform to a target surface, particularly when a longitudinal axis of the outer tube 64 is not perpendicular to the target surface. The tip 610 can pivot within the limits provided by an inner surface 650 of the lower end 63 of the outer tube 64. That is, side 652 can travel until abutting any point on the inner surface 650.

Figure 8:
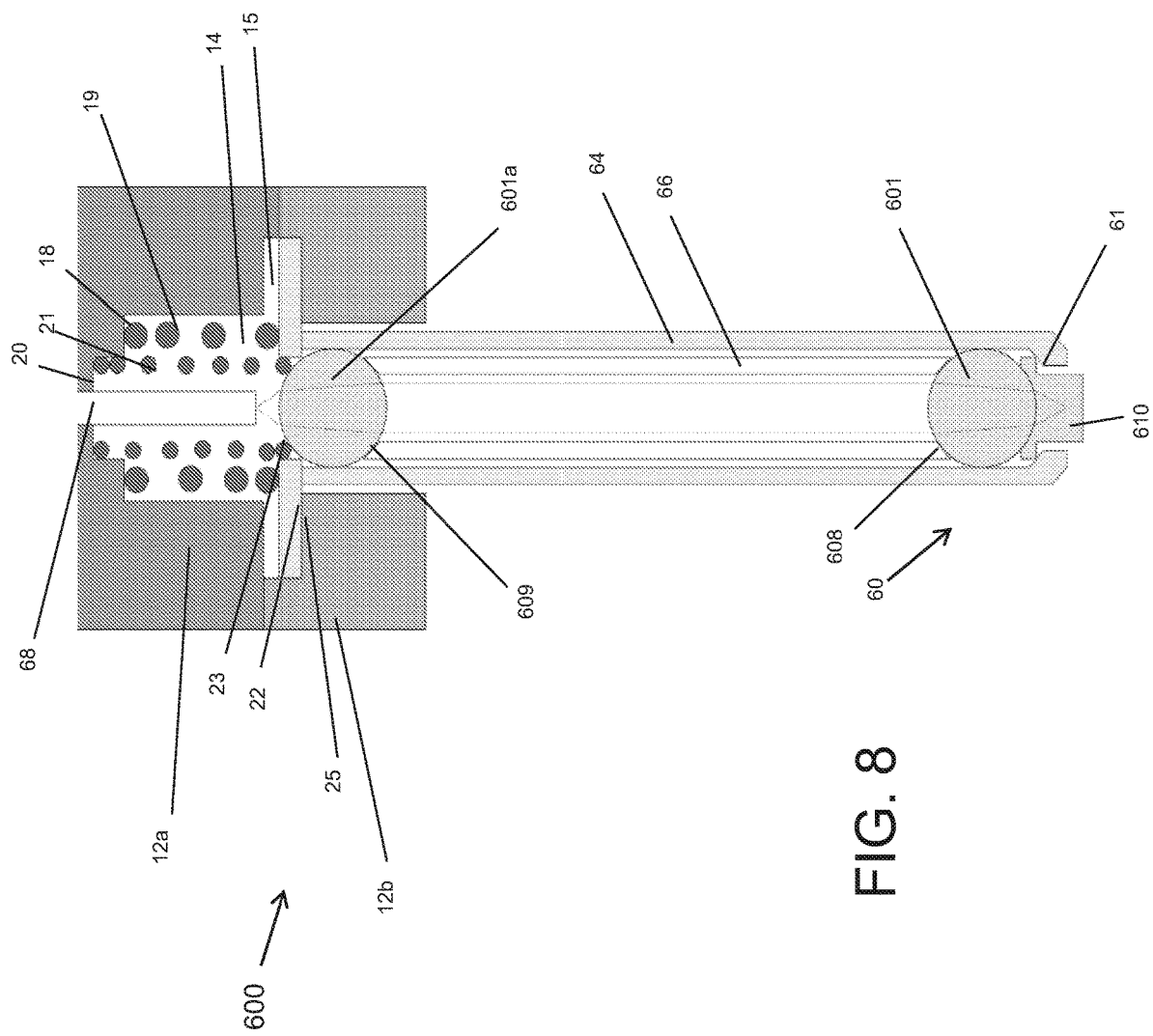
FIG. 8 is a cross-sectional view of a temperature probe including the self-aligning tip assembly shown in FIG. 7 wherein the optical fiber is displaced by an inner tube segment and an additional ball lens.

Depicted in FIG. 8 is a fiber optic temperature probe 600 including the self-aligning tip assembly 60 discussed above. The housing 12 comprises similar elements to those discussed with respect to FIG. 1, thus, for consistency, the reference characters of such elements are repeated.

The fiber optic temperature probe 600 comprises a second, or upper ball lens 601a in addition to the ball lens 601 and the inner tube 66 is positioned therebetween. The inner tube 66 is preferably provided coaxially with respect to the outer tube 64. The inner tube 66 includes upper and lower angled surfaces 609 and 608, respectively. The inner spring 21 pushes directly against the second ball lens 601a which, in turn pushes against the ball lens 601. The ball lens 601 is supported by the angled surface 61.

Similar to the example shown in FIG. 6, in the probe 600, the optical fiber 68 does not extend into the outer tube 64. Instead, the ball lenses 601 and 601a transmit and focus or collimate light between the optical fiber 68 and the tip 610. It may be that positioning the optical fiber 68 within the housing 12, where the environment is milder than the environment near the tip, can prolong the life of the optical fiber 68. It will be understood that the springs 21 and 19 are optional and alternative biasing mechanisms may be used. In another example embodiment, no biasing mechanisms are used.

The probes shown in FIGS. 1, 4B, 6 and 8 each include an inner spring within the housing to bias the inner tube toward the sensing tip. However, it will be understood that an inner spring can be provided between segments of the inner tube (e.g., in the probes shown in FIGS. 6 and 8) in addition to or alternatively to providing an inner spring in the housing.

Figure 9A:
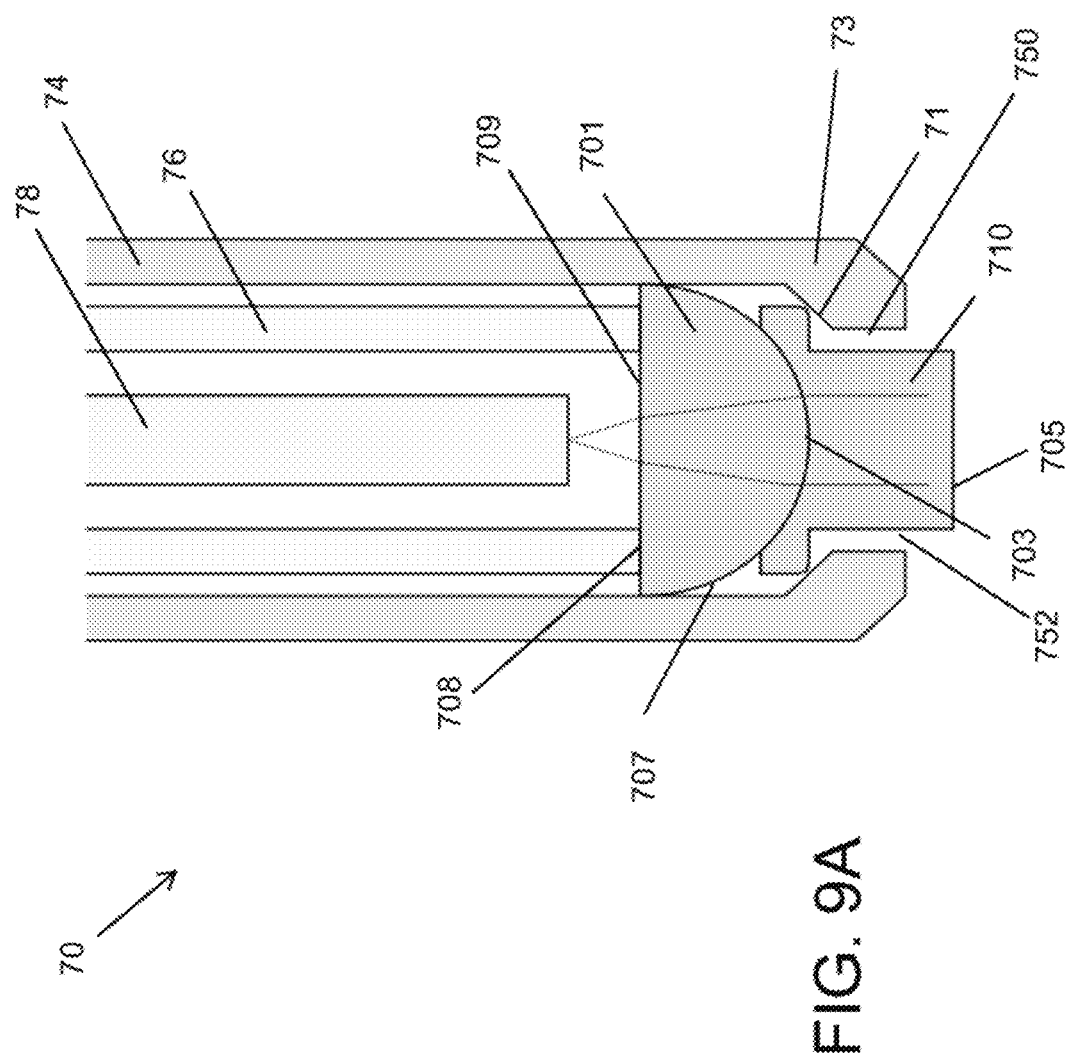
FIG. 9A is a cross-sectional view of a self-aligning tip assembly including a single half ball lens.

FIG. 9A illustrates a self-aligning tip assembly 70 similar to the tip assembly 60, however, the tip assembly 70 includes a half-ball lens instead of a ball lens. The tip assembly 70 includes a number of elements that are similar in structure to those in temperature probe 2 discussed above. Similar elements are therefore identified with the same reference characters used when discussing the temperature probe 2, but with the prefix "7" added (e.g., fiber 78).

Continuing with FIG. 9A, a half-ball lens 701 is disposed within an outer tube 74 between an inner tube 76 and a sensing tip 710. A curved surface 707 in the half-ball lens 701 sits against a cup-shaped surface 703 formed in the tip 710 which is, in turn, supported by an angled surface 71 in a lower end 73 of the outer tube 74. A flat surface 709 of the half-ball lens 701 can be retained against the cup-shaped surface 703 by flat or relatively flat end surface 708 of the inner tube 76. The cup-shaped surface 703 can glide over and rotate on the curved surface 707 and/or can move with the curved surface 707 as the half-ball lens 701 rotates. In this way, a bottom surface 705 of the tip 710 can at least partially conform to a target surface, particularly when a longitudinal axis of the outer tube 74 is not perpendicular to the target surface. The tip 710 can pivot within the limits provided by an inner surface 750 of the lower end 73 of the outer tube 74. That is, side 752 can travel until abutting any point on the inner surface 750.

Figure 9B:
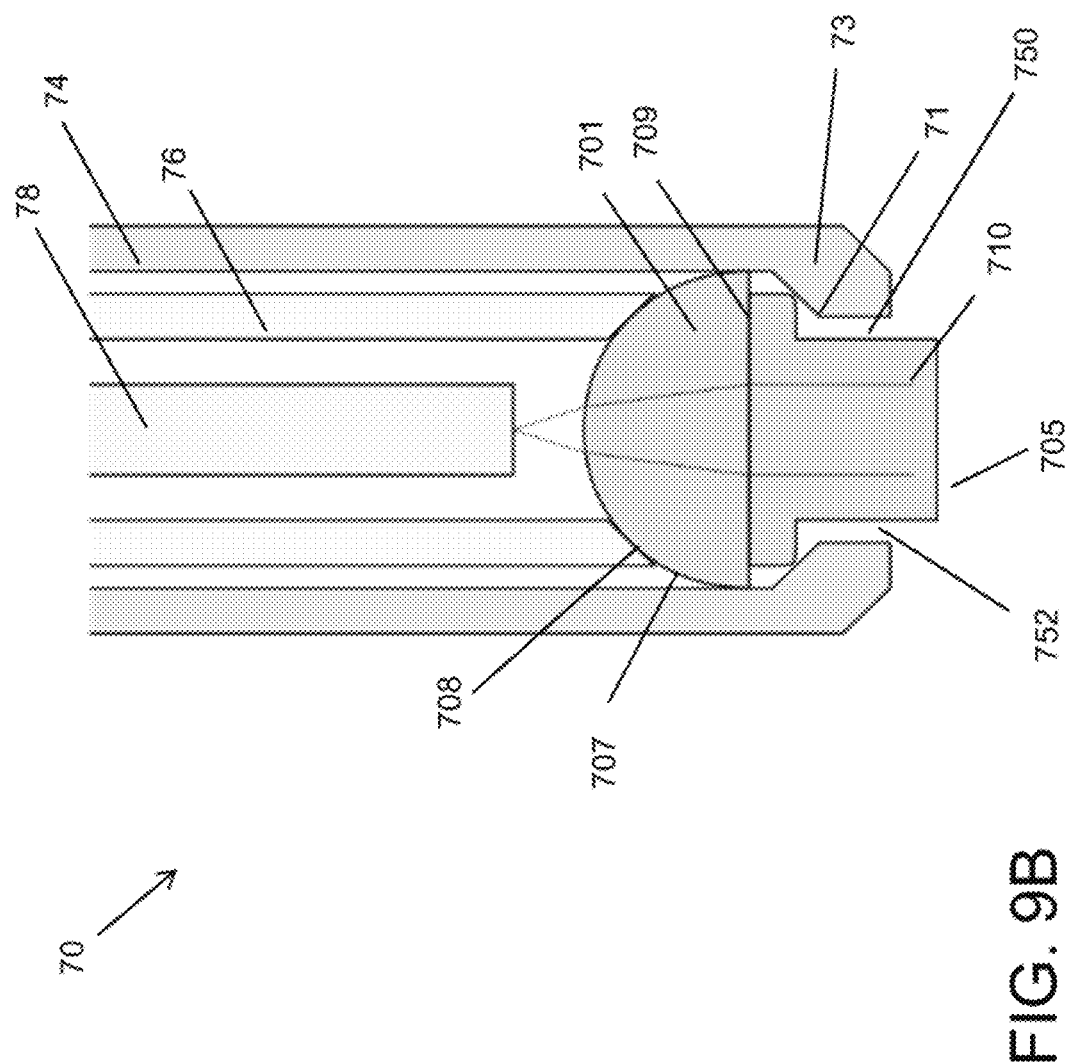
FIG. 9B is a cross-sectional view of the self-aligning tip assembly of FIG. 9A wherein the orientation of the half ball lens has been reversed.

FIG. 9B illustrates the self-aligning tip assembly 70 wherein the end surface 708 of the inner tube 76 is angled and the half-ball lens 701 has been flipped vertically. Thus, the curved surface 707 pushes against the angled end surface 708 and the flat surface 709 sits against the tip 710. In this configuration, the tip 710 can move as half ball-lens 701 rotates, i.e., as the curved surface 707 slides over the angled end surface 708, thereby allowing the bottom surface 705 to at least partially conform to a target surface.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. A fiber optic temperature probe comprising:
a base;
a first tube having a proximal end and a distal end, the proximal end being moveably connected to the base to permit the first tube to slide relative to the base as the distal end engages a surface;
a probe tip having a first end and a second end, the first end of the probe tip being coupled to the distal end of the first tube and the second end of the probe tip extending beyond the distal end of the first tube to engage the surface for measuring a temperature of the surface;
a sensing material in the probe tip;
an optical fiber extending from within the base through an opening in the proximal end of the first tube towards the sensing material and being substantially coaxial with respect to the first tube to direct an optical signal towards the sensing material in the probe tip; and
a first lens positioned between the probe tip and the optical fiber, wherein the optical fiber is in optical communication with the probe tip via the first lens.

2. The fiber optic temperature probe of claim 1, further comprising:
a second lens positioned between the first lens and the optical fiber or positioned between the first lens and the probe tip.

3. The fiber optic temperature probe of claim 2, further comprising:
a second tube provided coaxially within the first tube and being positioned between the first lens and the second lens.

4. The fiber optic temperature probe of claim 2, wherein the first lens and the second ball lens are either a ball lens or a half ball lens.

5. The fiber optic temperature probe of claim 1, further comprising:
a second tube provided coaxially within the first tube and being positioned between the base and the first lens.

6. The fiber optic temperature probe of claim 5, wherein the first and second tubes are axially movable independently of each other.

7. The fiber optic temperature probe of claim 6, further comprising a first biasing mechanism operable to urge the second tube toward the distal end of the first tube.

8. The fiber optic temperature probe of claim 6, further comprising a second biasing mechanism operable to permit controlled movement of the first tube relative to the base.

9. The fiber optic temperature probe of claim 8, wherein the first tube further comprises a flange at the proximal end that extends into an annular slot in the base, the second biasing mechanism bearing against the flange.

10. The fiber optic temperature probe of claim 6, wherein the probe tip is attached to the second tube, the probe tip further comprising a flange to retain the probe tip and second tube within the first tube.

11. The fiber optic temperature probe of claim 6, further comprising at least one lens interposed between the probe tip and the second tube or interposed between the second tube and a biasing mechanism operable to urge the second tube toward the distal end of the first tube, wherein the probe tip is in optical communication with the optical fiber via the at least one lens.

12. The fiber optic temperature probe of claim 11, comprising a first lens interposed between the probe tip and the second tube and a second lens interposed between the second tube and the biasing mechanism, wherein the probe tip is in optical communication with the optical fiber via the first and second lenses.

13. The fiber optic temperature probe of claim 11, wherein each of the at least one lens corresponds to a ball lens or a half ball lens.

14. The fiber optic temperature probe of claim 12, wherein the first lens and the second ball lens are either a ball lens or a half ball lens.

15. The fiber optic temperature probe of claim 11, wherein the at least one lens comprises a plurality of pairs of ball lenses, and the second tube comprises a plurality of portions, at least one portion of the second tube being interposed between adjacent pairs of ball lenses.

16. The fiber optic temperature probe of claim 11, wherein the probe tip is angularly movable relative to the first tube by interacting with the at least one lens.

17. The fiber optic temperature probe of claim 16, wherein the probe tip comprises a concave surface for interacting with a curved surface of an adjacent one of the at least one lens.

18. The fiber optic temperature probe of claim 5, further comprising a tip holder connected to and surrounding the distal end of the second tube and the probe tip to conduct heat to the probe tip.

19. The fiber optic temperature probe of claim 5, wherein the optical fiber or another optical fiber is connected to a narrowed portion of the second tube or base to suspend the optical fiber therefrom into the second tube.

20. The fiber optic temperature probe of claim 1, wherein the first lens corresponds to a ball lens or a half ball lens.

21. The fiber optic temperature probe of claim 1, wherein the first lens is positioned between the probe tip and a second lens, the first and second lens corresponding to a first pair of a plurality of pairs of ball lenses being positioned between the probe tip and the optical fiber.

22. The fiber optic temperature probe of claim 1, wherein the probe tip is angularly movable relative to the first tube by interacting with the first lens.

23. The fiber optic temperature probe of claim 22, wherein the probe tip comprises a concave surface for interacting with a curved surface of the first lens.

24. The fiber optic temperature probe of claim 1, further comprising:
   another optical fiber attached within the first tube and aligned with the optical fiber, wherein the other optical fiber is spaced from the optical fiber via a gap.

25. The fiber optic temperature probe of claim 1, further comprising a first biasing mechanism operable to urge the first tube away from the base.

* * * * *